(12) United States Patent
Sadjadi

(10) Patent No.: US 6,850,938 B1
(45) Date of Patent: Feb. 1, 2005

(54) METHOD AND APPARATUS PROVIDING OPTIMISTIC LOCKING OF SHARED COMPUTER RESOURCES

(75) Inventor: Shahrokh Sadjadi, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 345 days.

(21) Appl. No.: 09/781,525

(22) Filed: Feb. 8, 2001

(51) Int. Cl.[7] ................................................. G06F 7/00
(52) U.S. Cl. ........................... 707/8; 707/9; 709/248; 713/165; 713/167; 711/150; 711/151
(58) Field of Search .................... 707/8, 9; 709/248; 713/165, 167; 711/150, 151

(56) References Cited

U.S. PATENT DOCUMENTS

| | | |
|---|---|---|
| 5,193,162 A | 3/1993 | Bordsen et al. |
| 5,276,835 A | 1/1994 | Mohan et al. |
| 5,276,848 A | 1/1994 | Gallagher et al. |
| 5,280,611 A | 1/1994 | Mohan et al. |
| 5,287,473 A | 2/1994 | Mohan et al. |
| 5,297,269 A | 3/1994 | Donaldson et al. |
| 5,327,556 A | 7/1994 | Mohan et al. |
| 5,680,576 A | 10/1997 | Laudon |
| 5,742,813 A * | 4/1998 | Kavanagh et al. ............. 707/8 |
| 5,829,032 A | 10/1998 | Komuro et al. |
| 5,832,516 A | 11/1998 | Bamford et al. |
| 5,903,910 A | 5/1999 | Tran et al. |
| 5,924,096 A | 7/1999 | Draper et al. |
| 5,966,706 A | 10/1999 | Biliris et al. |
| 5,987,477 A | 11/1999 | Schmuck et al. |
| 6,052,758 A | 4/2000 | Crockett et al. |
| 6,085,198 A | 7/2000 | Skinner et al. |
| 6,092,157 A | 7/2000 | Suzuki |
| 6,151,607 A | 11/2000 | Lomet |
| 6,154,811 A | 11/2000 | Srbljic et al. |
| 6,256,712 B1 | 7/2001 | Challenger et al. |
| 6,279,084 B1 | 8/2001 | VanDoren et al. |
| 6,353,836 B1 | 3/2002 | Bamford et al. |
| 6,389,420 B1 * | 5/2002 | Vahalia et al. .................. 707/8 |
| 6,493,804 B1 * | 12/2002 | Soltis et al. ................. 711/152 |

FOREIGN PATENT DOCUMENTS

| | | |
|---|---|---|
| EP | 0 471 282 A2 | 2/1992 |
| EP | 0 499 422 A2 | 8/1992 |
| EP | 0 657 813 A1 | 6/1995 |
| EP | 0 750 260 A2 | 12/1996 |
| WO | WO 91/03024 A1 | 3/1991 |
| WO | WO 99/41664 A1 | 8/1999 |

OTHER PUBLICATIONS

Rana Ejaz Ahmed, et al., "Cache–Aided Rollback Error Recovery (CARER) Algorithms for Shared–Memory Multiprocessor Systems," 1990, IEEE, pp. 82–88.

(List continued on next page.)

*Primary Examiner*—Shahid Alam
*Assistant Examiner*—Hung Pham
(74) *Attorney, Agent, or Firm*—Hickman Palermo Truong & Becker LLP

(57) ABSTRACT

Techniques for concurrent access to a resource object, such as a database, include generating a lock data structure for a particular resource object. The lock data structure includes data values for a resource object identification, a lock type, and a version number. The version number is related to a number of changes to the resource object since the lock data structure was generated. A request is received from a requesting process. The request is for a requested lock type for access to the particular resource object. It is determined whether to grant the request based on the requested lock type and the lock type in the lock data structure. By carrying a lock version number in a lock data structure managed by a lock manager, improved optimistic locking is provided in a database. In particular, the approach enables introduction of optimistic locking to a legacy database without requiring burdensome changes to a database table schema.

28 Claims, 7 Drawing Sheets

OTHER PUBLICATIONS

Anne–Marie Kermarrec, et al., "A Recoverable Distributed Shared Memory Integrating Coherence and Recoverability," Jun. 27, 1995, IEEE, XP 000597800, pp. 289–298.

Michael J. Feeley, et al., "Implementing Global Memory Mangement in a Workstation Cluster," SIGOPS '95, 12/95, XP 000584826, pp. 201–212.

C. Mohan, et al., "A Case Study of Problems in Migrating to Distributed Computing: Data Base Recovery Using Multiple Logs in the Shared Disks Environment", IBM Research Report RJ 7343 (68824), Database Technology Institute, IBM Almaden Research Center, Mar. 7, 1990, 20 pages.

C. Mohan, et al., "Solutions to Hot Spot Problems in a Shared Disks Transaction Environment", IBM Research Report RJ 8281 (75642), Data Base Technology Institute, IBM Alamaden Research Center, Aug. 5, 1991, 25 pages.

C. Mohan, et al., "Efficient Locking and Caching of Data in the Multisystem Shared Disks Transaction Environment", IBM Research Report RJ 8301 (75662), Data Base Technology Institute, IBM Almaden Research Center, Aug. 21, 1991, 20 pages.

C. Mohan, et al., "Data Base Recovery in Shared Disks and Client–Server Architectures", IBM Research Report RJ 8685 (78247), Data Base Technology Institute, IBM Almaden Research Center, Mar. 1992, 20 pages.

J. W. Josten, et al., "DB2's Use of the Coupling Facility for Data Sharing", http://www.research.ibm.com/journal/sj/362/josten.html, IBM Systems Journal, vol. 36, No. 2, printed Jul. 30, 2001, 25 pages.

C. Mohan, et al., "Recovery and Coherency–Control Products for Fast Intersystem Page Transfer and Fine–Granularity Locking in a Shared Disks Transaction Environment", IBM Research Report RJ 8017 (73665), Data Base Technology Institute, IBM Almaden Research Center, Mar. 15, 1991, 31 pages.

Abstracts of Some C. Mohan's Papers and Patents, Updated on Sep. 1, 2000, http://www.almaden.ibm.com/u/mohan/aries_papers.html, printed Jul. 23, 2001, 31 pages.

* cited by examiner

METHOD AND APPARATUS PROVIDING OPTIMISTIC LOCKING OF SHARED COMPUTER RESOURCES

FIELD OF INVENTION

The present invention generally relates to sharing access to a computer resource among distributed users. The invention relates more specifically to techniques for optimistic locking of a shared computer resource object, such as a database object in a database.

BACKGROUND OF THE INVENTION

In many network database operations, a client process executing on one computing device, such as a personal computer or a network router, exchanges data with a database server process executing on a host computing device. A router is a network device that sends packets received from a source machine on an input port to a destination machine along one of several output ports, according to one or more protocols and routing rules.

A database comprises a plurality of database records, each record containing values for one or more attributes, in one or more tables of records. The attributes are the kinds of information kept in the database. For example, employee name, social security number, address, etc. are attributes of data in records for a database about a company's personnel. As another example, a network device address, device type, list of component switches, and a mapping of input ports to output ports may be attributes of a database used by a network management system. The database server maintains a schema describing the attributes in each record and the relationship among the tables. The schema is established as part of the initial formation of the database. In object-oriented databases, attributes, records, tables, and schema are treated as objects that are defined by values of certain properties and methods to manipulate those properties.

In operations in which several client and database server processes are running concurrently, it is well known that more than one process can attempt to access the same record, or other database object, concurrently, i.e., during the same time interval. Therefore, in many conventional systems, the database server interacts with a lock manager process that maintains a locking data structure. The locking data structure carries information about which database objects have been requested by one or more processes. If a process requests access to the particular database object, the lock manager determines whether the requested access conflicts with prior requests for the database object. Prior requests can be earlier in time or higher in priority. If not, a lock is granted to the requesting process. The lock identifies the database object, and the type of access granted. The process then accesses the database object, as permitted by the lock. When finished, the process releases the lock to the lock manager, which may then grant the lock to another requesting process. If the requested access does conflict with a prior request, the lock is denied. Some lock managers may store a reference to the requesting process in a queue in the locking data structure so that when the lock is available, the requesting process is automatically granted the lock. Other lock managers may use different techniques, such as requiring the requesting process to make a new request at a later time.

In conventional lock managers, two types of access are recognized. One type of access, such as read access to obtain values stored in a database object, can occur at the same time as other processes that request the same type of access. Shared locks are granted to such requests. Another type of access, such as write access to change the contents stored in a database object, cannot be shared with other processes also attempting to write. Non-shared, exclusive locks are granted to such requests. When a shared lock is granted, another process requesting shared access is also granted a shared lock. When an exclusive lock is granted to a first process, another process requesting exclusive access is not granted a lock until the first process releases or returns its lock. When an exclusive lock is granted to a fist process, another process requesting access of any type to the same database object is denied. When an exclusive lock is requested by a process, the process is denied a lock even if a prior process has a shared lock.

In "pessimistic" locking, an update process, which retrieves values from a database object in anticipation of sending one or more new values for the database object and later commits those new values to the database, requires an exclusive lock. For example, assume that a banking database has a record for each account that includes an account balance as an attribute. A particular record has a value of $300 in the account balance. Assume further that two processes need to update this record to show deposits, wherein a first process makes a deposit of $20 and the second process a deposit of $10. With a shared lock it is possible for both processes to read the current deposit of $300, the first process to compute a new account balance of $320 and the second to compute a new account balance of $310. Then, even if the write operations for the two processes obtain exclusive locks, after the first process writes the new value the account balance is $320 and after the second process writes, the account balance is $310. Neither results in the correct total of $330 reflecting both deposits. Pessimistic locking assumes that all read operations during an update are invalid and prevents other processes from reading during the entire interval from a start of a granted lock for the updating process to the final release of the exclusive lock. It also prevents a process from starting an update while another process is retrieving information from a database object. In systems having a large number of reads, this approach creates a bottleneck in which many read processes are held up by relatively few updates.

In optimistic locking, a new type of access is recognized, such as for an updating process, and granted an optimistic lock. An optimistic lock does not prevent a second process from obtaining a shared or optimistic lock on the same database object. Also, a shared lock does not prevent a second process from obtaining an optimistic lock. At the time of an update commit, the lock manager converts the optimistic lock to an exclusive lock until the commit is complete, and then the lock manager releases the lock. The time period of this exclusive lock is expected to be shorter than the time period from start of update to end of commit. Therefore, the bottleneck problem is reduced.

A database server using optimistic locking determines at the time of committing the update whether the values being replaced by the commit have not changed since those values were read at the start of the update. If the values have not changed since the start of the update, the commit can go forward. However, if the values have changed, then there may be a problem and the commit is not allowed to progress. For the example given above, if the balance was $300 when the update started but is now $320 when the associated commit is occurring, then an intervening commit occurred and the commit from the current update has a value that is likely in error, reflecting an incorrect final balance. Thus the new commit is not allowed to progress by the database server.

In conventional optimistic locking, a version number is stored with each database object, for example, as an attribute in each record of each table. The version number is incremented when the content of the database object changes, as with a write or commit, by the database server process (or a separate commit agent process managed by the database server process). When a commit is received from the client process by the database server process (or commit agent), the database server process (or commit agent) obtains a temporary exclusive lock on the database object, and checks the version with the data to be committed against the version in the database object. If they differ, the database server (or commit agent) sends a message identifying the failure to the client process. The client process must then restart the update process, which involves the database server process obtaining an optimistic lock and retrieving values from the database object.

Optimistic locking allows systems that involve many reads compared to the number of updates to proceed more quickly with less time waiting for locks. However, there are some deficiencies that limit throughput obtained by the conventional optimistic locking techniques. For example, having a version number in the database object takes up more space in the database, and increases the amount of data that must be kept in a log of database transactions.

Optimistic locking also increases the volume of data that must be sent to and retrieved from relatively slow, persistent storage devices (e.g., disk drives) as database objects are moved out of and into relatively fast cache memory during database operations.

Another deficiency relates to changing from pessimistic locking, which is used in many legacy computer systems, to optimistic locking. Making such a change involves a change in database schema, because a version number attribute must be added to database objects. Where a database or table is large, e.g., in the gigabyte range, changing the schema for a database is a relatively arduous task with disadvantages of its own, such as consuming substantial amounts of time of a database administrator, and bringing the database offline for a period of time that is undesirable and often disruptive to the users of the database.

Furthermore, database operations may evolve to a state in which the number of updates approaches the number of reads, warranting a change back to pessimistic locking. Similarly, database operations may evolve from states warranting pessimistic locking to states warranting optimistic locking. Thus the schema would have to be changed several times over the life of a database, with each change consuming database administrator time and intruding on database availability to the users.

Based on the foregoing, there is a clear need for new techniques for optimistic locking that reduce the size of database objects and transaction logs.

There is also a need for ways to provide optimistic locking that do not involve a change in database schema when switching between optimistic and pessimistic locking.

SUMMARY OF THE INVENTION

The foregoing needs, and other needs and objects that will become apparent from the following description, are achieved in the present invention, which comprises, in one aspect, a method of providing concurrent access to a database object. The method includes generating a lock data structure for a particular database object. The lock data structure or "lock" includes data indicative of values for a database object identification, a lock type, and a version number. The version number is related to a number of changes to the database object since the lock data structure was generated. A request is received from a requesting process. The request is for a requested lock type for access to the particular database object. It is determined whether to grant the request based on the requested lock type and the lock type in the lock data structure. In an embodiment of this aspect, the method also includes receiving a lock to be released. The lock includes values for the database object identification and the lock type and the version number. It is determined whether the lock type in the lock to be released indicates an exclusive lock. If it is an exclusive lock, then the value for the version number in the lock data structure is changed based on the value of the version number in the lock to be released.

In another aspect of the invention, a method of updating a database object using optimistic locks includes receiving from a client process a request to update a particular database object. A request is sent to a lock manager process. The request is for a first lock for access to the particular database object. The request includes data indicating an optimistic lock type. The first lock is received. The first lock includes data indicating the database object, the optimistic lock type and a first value for a version number. The version number is related to a number of changes to the database object since the lock manager generated a lock data structure corresponding to the database object. The optimistic lock is used to update the database object.

In an embodiment of this aspect, using the optimistic lock to update the database object includes sending to a lock manager process a request to upgrade the optimistic lock to exclusive in order to gain access to the particular database object. The request includes the database object identification, the exclusive lock type and a second value for the version number. It is determined whether the second value for the version number substantially equals the first value for the version number. If so, then the lock is upgraded, the lock is released, and the second value of the version number in the second lock is replaced with a third value of the version number. The third value is computed by adding the second value and a predetermined version change value, or by incrementing.

In other aspects, the invention encompasses an apparatus, a computer apparatus, and a computer readable medium to carry out the foregoing steps.

With the version number as part of the lock object and as part of the lock data structures in a lock table, optimistic locking can be performed without changing the database objects themselves, such as the database records, tables, or schema.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for optimistic locking is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Operational Contex

The present invention is related to using optimistic locks to obtain concurrent access to objects in a shared computer resource, such as a database. As used herein, an object is any item that can be separately accessed by a reference. It includes variables, buffers, registers, data structures, methods, and groupings of data and methods. The resource can be any shared computer resource for which concurrent access is desired, such as a printer, another computer-controlled device, and a database. For the purposes of illustration, the invention will be described in embodiments involving a database for which concurrent access is desired to database objects, such as database tables and database records.

Figure 1:
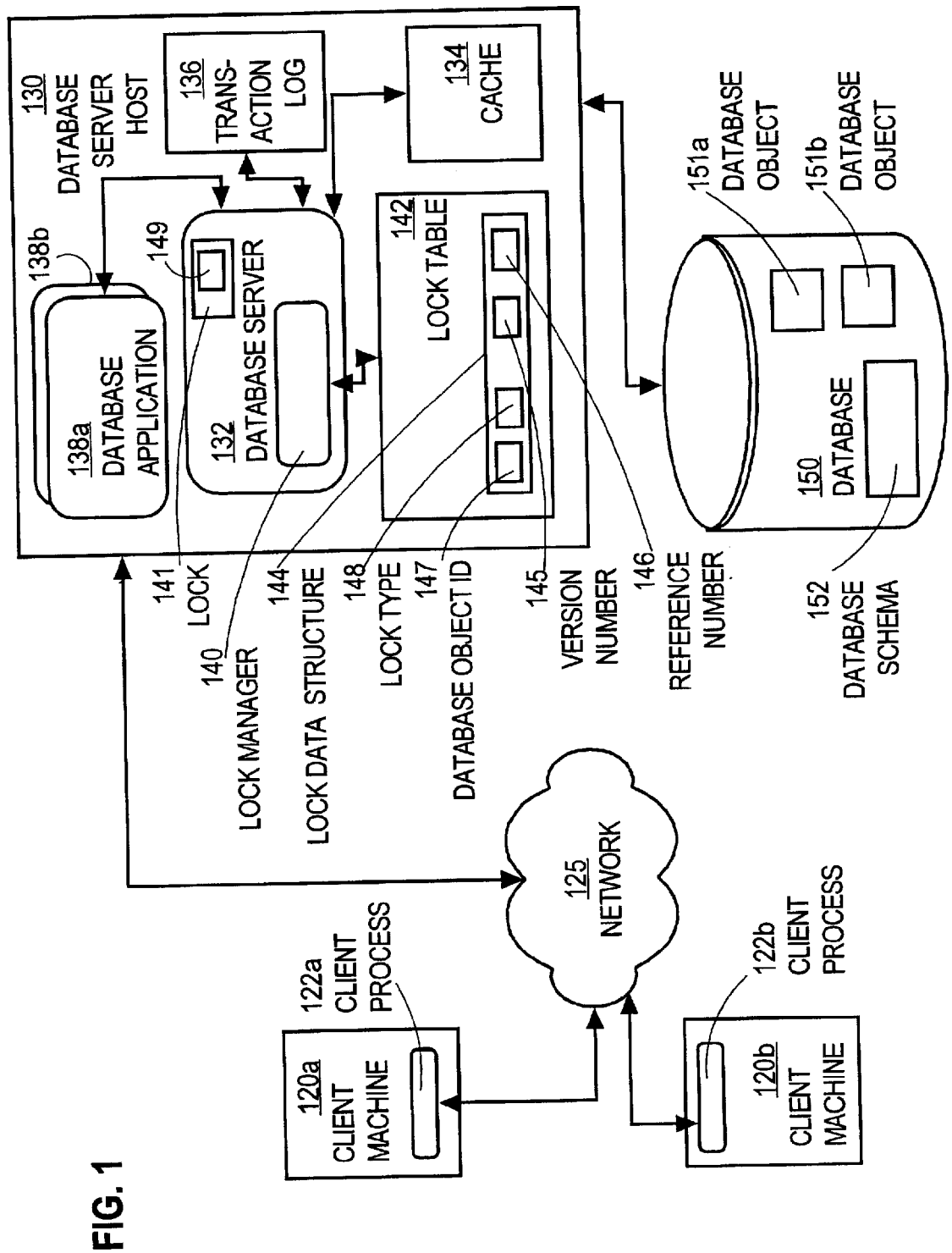
FIG. 1 is a block diagram that illustrates an operational context of an embodiment, including components of a lock manager process for a database server.

FIG. 1 is a block diagram that illustrates an operational context of an embodiment, including components of a lock manager process for a database server. A database 150 is controlled by a database server process 132 executing on a database server host 130. One or more database applications 138 also run on the database server host 130 or as client processes 122 on client machines 120 connected to the database server host 130 through a network 125. In some embodiments, the database application 138 interacts with the database server process 132 and with one or more client processes 122 on client machines 120. In other embodiments, the client processes 122 are themselves database applications that interact directly with the database server process 132. The database 150 includes a database schema 152, which describes the attributes in each table and the tables that make up the database, and other database objects 151, such as tables and records in tables.

Concurrent access in this context refers to one or more database applications 138 or client processes 122 attempting to read or write to the same database object 151 during overlapping periods of time. For example, database application 138a attempts to read database object 151a while database application 138b is attempting to write to database object 151a. Optimistic locking allows the first database application 138a to attempt to update database object 151a while database application 138b is also attempting to update database object 151a. As described in the background section, in the conventional systems this is done by a placing a version number in each database object 151a. As a consequence, the database schema 152 has to be modified to indicate that the database objects 151 include a version number attribute.

According to an embodiment, a lock data structure 144 carries a version number value. The lock data structure 144 is used by a lock manager 140, which is a process running under the control of the database server 132. For example, in one embodiment, the lock manager 140 is an agent process spawned by the database server 132. The operation of the lock manager 140, and the operation of the database server 130 during updates, are modified to deal with the change of location of the version number.

Structural Overview

The memory structures used by database server process 132 include a cache 134, a transactions log 136, a lock table 142 containing zero or more lock data structures 144, and a lock object 141. The cache 134 is a portion of high-speed memory on the database server host 130 where database objects normally stored on a slow speed persistent storage device are placed temporarily, as needed by the database server. In a conventional system in which database objects include a version number, the size of each database object is increased, resulting in a corresponding increase in the portion of cache 134 that a given number of database objects consume. The transactions log 136 records the database transactions such as reading, deleting, updating, and committing changes to the database objects in the sequence in which they occur. The transactions log records the commands and the database objects being operated on. In a conventional system, which adds a version number to the database object, the size of the transactions log is also increased. The transactions log is often stored by the database server host at least partly on relatively slow persistent storage. Thus the conventional system causes more data to be written to relatively slow persistent storage to support the transactions log 136.

A lock data structure 144 is generated for each database object for which at least one database application is requesting access. A lock table 142 comprises all the lock data structures 144, if any, to track access of the requested database objects.

According to an embodiment, a lock data structure 144 includes a version number field 145 that stores a version number of a corresponding database object. The value of the version number field 145 is related to the number of times the database object associated with the lock data structure has been changed since the lock data structure was generated.

The lock data structure 144 also includes a field 146 for a reference number. The value of the reference number field 146 is related to the number of applications requesting access to the database object corresponding to the lock data structure. When zero applications are requesting access to the database object corresponding to the lock data structure, as indicated by the value of the reference number field 146, then the lock data structure can be deleted from the lock table, thereby reclaiming memory space.

The lock manager 140 is a process or agent of the database server 132. It builds and maintains the lock table 142 by adding, modifying and deleting lock data structures 144 for each requested database object 151. The lock manager responds to requests from the database server for obtaining locks and releasing locks.

The lock data structure 144 also includes an object identifier field 147 that carries a value that identifies the database object that corresponds to the lock data structure.

The lock data structure 144 includes a field 148 indicating a lock type. For example, a first value, S, indicates a shared lock type, a second value, E, indicates an exclusive lock type, and a third value, O, indicates an optimistic lock type. "S", "E", and "O" are merely exemplary labels that can be used to indicate the various lock types.

The lock manager 140 uses information in the lock data structures 144 to grant a lock object 141 to the database server 132, so that the database server 132 can respond to requests from the database applications 138 to access the database objects in cache 134 or on persistent storage. The lock object 141 indicates the lock type and identifies the corresponding database object with the database object identification.

The database server must have a lock object 141 specifying a particular database object and a lock type in order to access that database object in a manner allowed by the lock type. Each lock object 141 includes a version number field 149 for the version number. The version number field 149 in the lock object 141 reflects the value of the version number in the lock data structure at the time the lock object 141 was generated. At a particular instant of time, the value in the version number field 145 in the lock data structure 144 maybe different than the value in the version number field 149 in the lock object 141. This can occur if the database object corresponding to the lock data structure has changed since the lock object 141 was generated, as can occur during updates with optimistic locking. The sequence of the steps during optimistic locking is described in greater detail in a later section.

In embodiments described herein, version values are described as "version numbers" or with reference to "version number fields." However, any suitable form of data representation may be used for version values. For example, version values may be stored as binary or hexadecimal values, alphabetic characters, alphanumeric symbols, etc.

Functional Overview

Figure 2A:
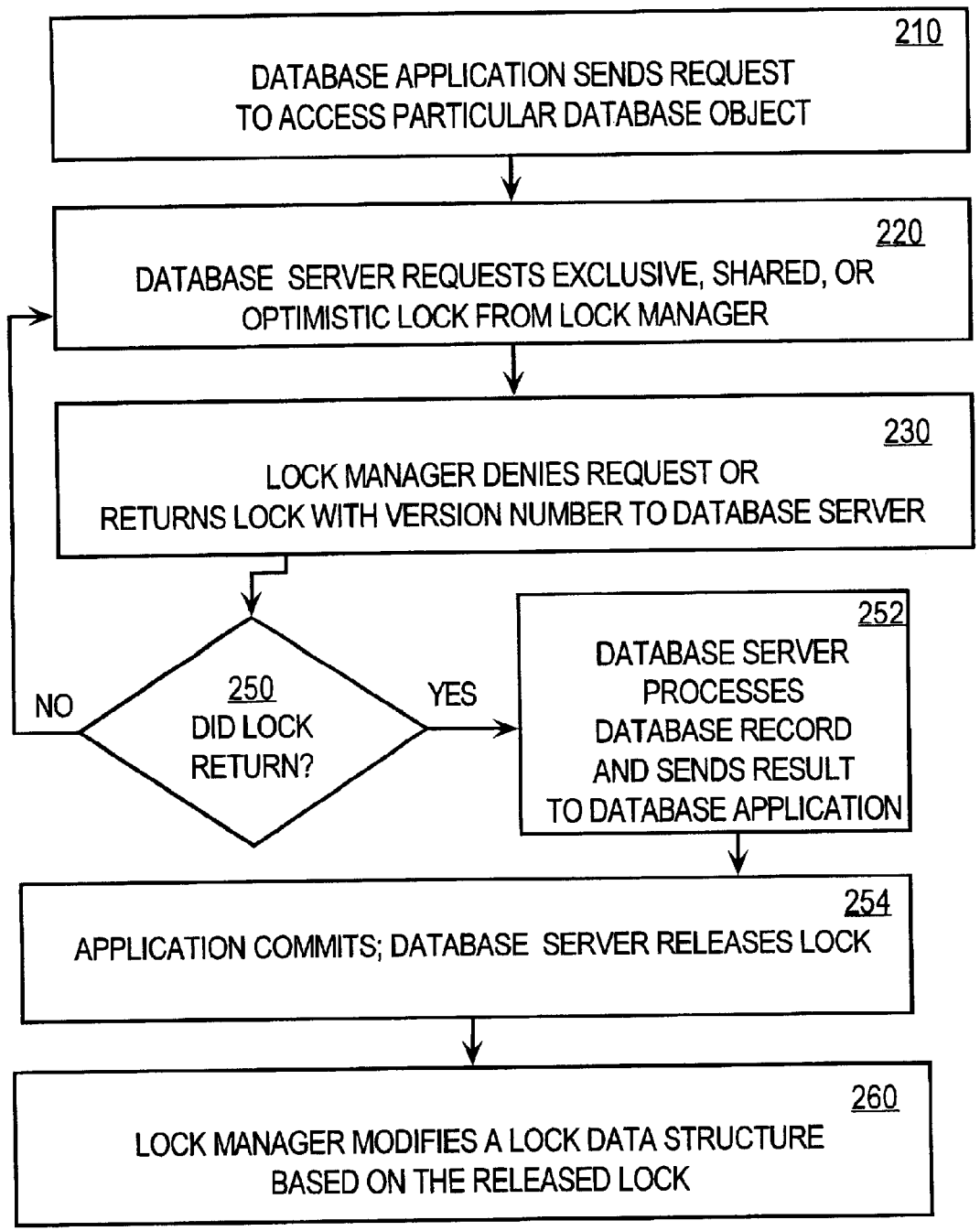
FIG. 2A is a flowchart that illustrates a high level overview of interactions between a client application, a database server, and a lock manager according to one embodiment of a method for providing concurrent access to a database.

FIG. 2A is a flowchart that illustrates a high level overview of interactions between a client application, a database server, and a lock manager according to one embodiment of a method for providing concurrent access to a database.

In step 210, a database application 138 sends a request to the database server 132 for access to a particular database object 151a, such as a record in a database table. In step 220, the database server 132 requests a lock object 141 from the lock manager 140. Depending on the kind of request from the database application, the database server requests an exclusive, shared, or optimistic lock from the lock manager. For example, if the database application request is for reading the database object, then the database server requests a shared lock from the lock manager. If the database application request is for committing a change in the database object to the database, than the database server requests an exclusive lock from the lock manager. If the database application request is for updating the database object, then the database server requests an optimistic lock from the lock manager.

In step 230, the lock manager denies the request from the database server if the requested lock type conflicts with a lock type granted in a prior lock which has not yet been released. If there is no such conflict, the lock manager sends or returns a lock object to the database server. The lock object 141 that is sent includes a value in the version number field 149 equal to the value in the version number field 145 in the lock data structure 144 at the time the lock is granted. The processing performed during step 230 by the lock manager 140 in one embodiment is described further with respect to FIG. 2B.

Step 250 represents a branch point at which control passes to different paths according to whether a lock was returned. If the request was denied, then no lock was returned, and control passes back to step 220 where the database server can request a lock again. In the illustrated example embodiment, the database server must again request a lock when a lock is denied. In other embodiments, a queue of requests for locks is maintained by the lock manager, and when a lock becomes available the database server is automatically notified. Other processes for dealing with denial of access may be used.

When the lock is returned, control passes to step 252 in which the database server accesses and processes the database object according to the requests from the database application and sends a result, if any, to the database application. The processing performed during step 252 by the database server, including agents of the database server, for one embodiment using optimistic locks in response to a request from the database application for an update, is described further with respect to FIG. 3A and FIG. 3B.

Assume that when the processing in step 252 is complete, the database application carries out any other needed processing and then commits. In that event, and as a result, as shown by step 254, the database server releases the lock for the particular database object. Control then passes to step 260 in which the lock manager modifies the lock data structures based on the lock being released. The processing performed during step 260 by the lock manager in one embodiment is described further herein with respect to FIG. 2C.

Request for Lock

Figure 2B:
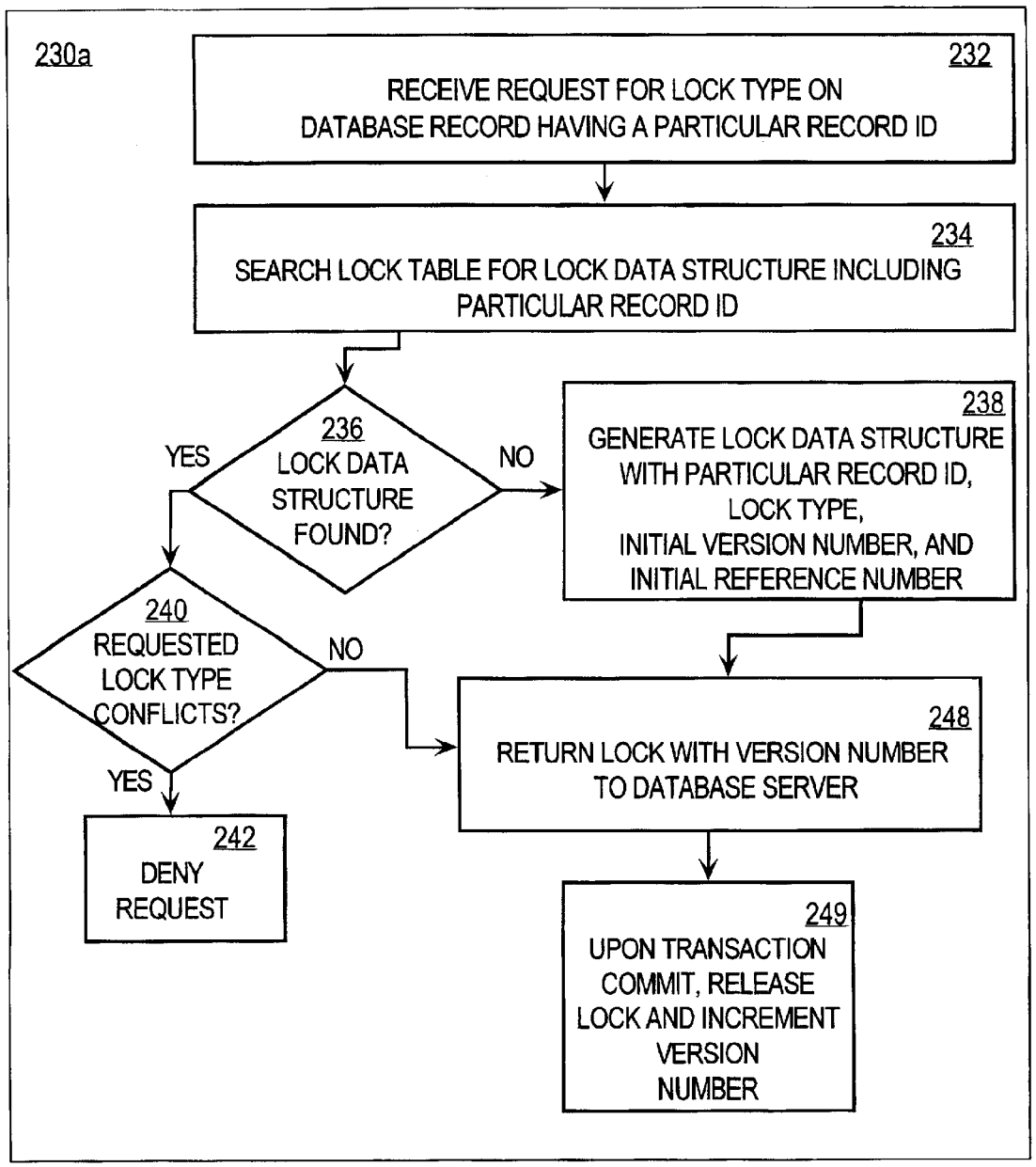
FIG. 2B is a flowchart that illustrates processing of a request for a lock by a lock manager according to one embodiment of a method for providing concurrent access to a database.

FIG. 2B is a flowchart that illustrates processing by a lock manager of a request for a lock from a database server according to one embodiment 230a of step 230 in FIG. 2A as part of providing concurrent access to a resource.

In step 232, the lock manager receives a request from the database server indicating a lock type desired and a particular database record specified by its database object identification, such as a record ID. In step 234, the lock manager searches the lock table 142 for a lock data structure 144 that has a database object identification equal to the database object identification in the request. Step 236 represents a branch point based on whether a lock data structure is found in the lock table 142 with the requested database object identification. If not, a new lock data structure is generated in step 238. The lock manager generates the new lock data structure including the value of the particular database object identification, such as a record ID, in the database object ID field 147. The new lock data structure includes a lock type requested, such as value "O" indicating Optimistic, in the lock type field 148. The new lock data structure is generated with an initial value for the version number in the version number field 145. For example, an initial value of the version number is the value "1." This initial value indicates that the database object contains a first version of its data at the time the lock data structure 144 was generated. The new lock data structure also includes an initial value for the reference number field 146. For example, an initial value of the reference number is the value "1." This initial value indicates that only one database application has requested access to this particular database object at the time the lock data structure 144 was generated. Control then passes to step 248 in which a lock object 141 is generated from the information in the lock data structure 144 and returned to the database server process 132.

If, during step 236, the lock table is found to contain a lock data structure having a value for the database object ID equal to the database object identification in the request, then flow passes to step 240 to determine whether the new lock type is in conflict with the lock type of the lock already granted. If the requested lock type is not in conflict with the lock type already granted and stored in the lock data structure 144, then control passes to step 246. If not, the request for lock is denied in step 242.

For purposes of illustrating conflict testing at step 240, Table 1 is a lock type conflicts table that shows conflict results for the three lock types—shared, exclusive and optimistic, represented by the values S, E and O. Each column of the lock type conflicts table represents a granted lock type as recorded in the lock data structure 144. Each row of the lock type conflict table represents a requested lock type.

TABLE 1

LOCK TYPE CONFLICTS

|  | Granted E | Granted S | Granted O |
| --- | --- | --- | --- |
| Requested E | Conflict (not allowed) | conflict (not allowed) | special (not denied) |
| Requested S | Conflict (not allowed) | allowed | allowed |
| Requested O | Special (not denied) | allowed | allowed |

According to Table 1, step 240 encounters a conflict when a requested exclusive lock type results in finding, in the lock table, a lock data structure for the same database object that has an exclusive or shared lock type. Step 240 also encounters a conflict when a requested shared lock type encounters a lock data structure that has granted an exclusive lock type. In these cases, control passes to step 242 in which the request for lock is denied. For all other cases, control passes to step 248.

In step 248, a lock object 141 is generated based on information in the lock data structure 144 corresponding to the requested database object. In this embodiment, the lock object 141 includes a value for the database object identification, a value for the lock type, and a value for the version number all taken from the lock data structure 144 at the time the lock object 141 is generated.

Step 249 is executed when the associated database application commits. Thus, before control reaches step 249, intermediate processing of the database application may occur, until a commit point is reached.

In step 249, the value stored in the version number field of the lock data structure 144 is monotonically changed by adding a fixed, predetermined reference change. By monotonically changing the value in the version number every time a new lock is granted, the value in the version number field will reflect the number of changes in granted locks for the particular database object corresponding to the lock data structure 144. In one embodiment, the fixed predetermined change is a positive "1", and a monotonic change increments the value in the version number field. In another embodiment, the predetermined change is a different positive or negative number. In one embodiment, the value in the lock type field 148 in the lock data structure 144 is changed to the requested lock type if the requested lock type is different than the granted lock type, except if the granted lock type is exclusive and the requested lock type is optimistic. In this case, the lock type in the lock type field 148 of the lock data structure 144 is left exclusive. The monotonic change of a version number value in step 249 and leaving the granted exclusive lock type when the requested lock type is optimistic are part of the special processing of requests indicated in Table 1. Thus, changing or incrementing the version number value occurs when a lock is released and a transaction commits.

No step during the processing of requests for new locks causes the value of the version number field 145 to change. Changes to the value in the version number field 145 occur only when an exclusive lock is released, as explained further in the next section.

Release and Upgrade of Lock

Figure 2C:
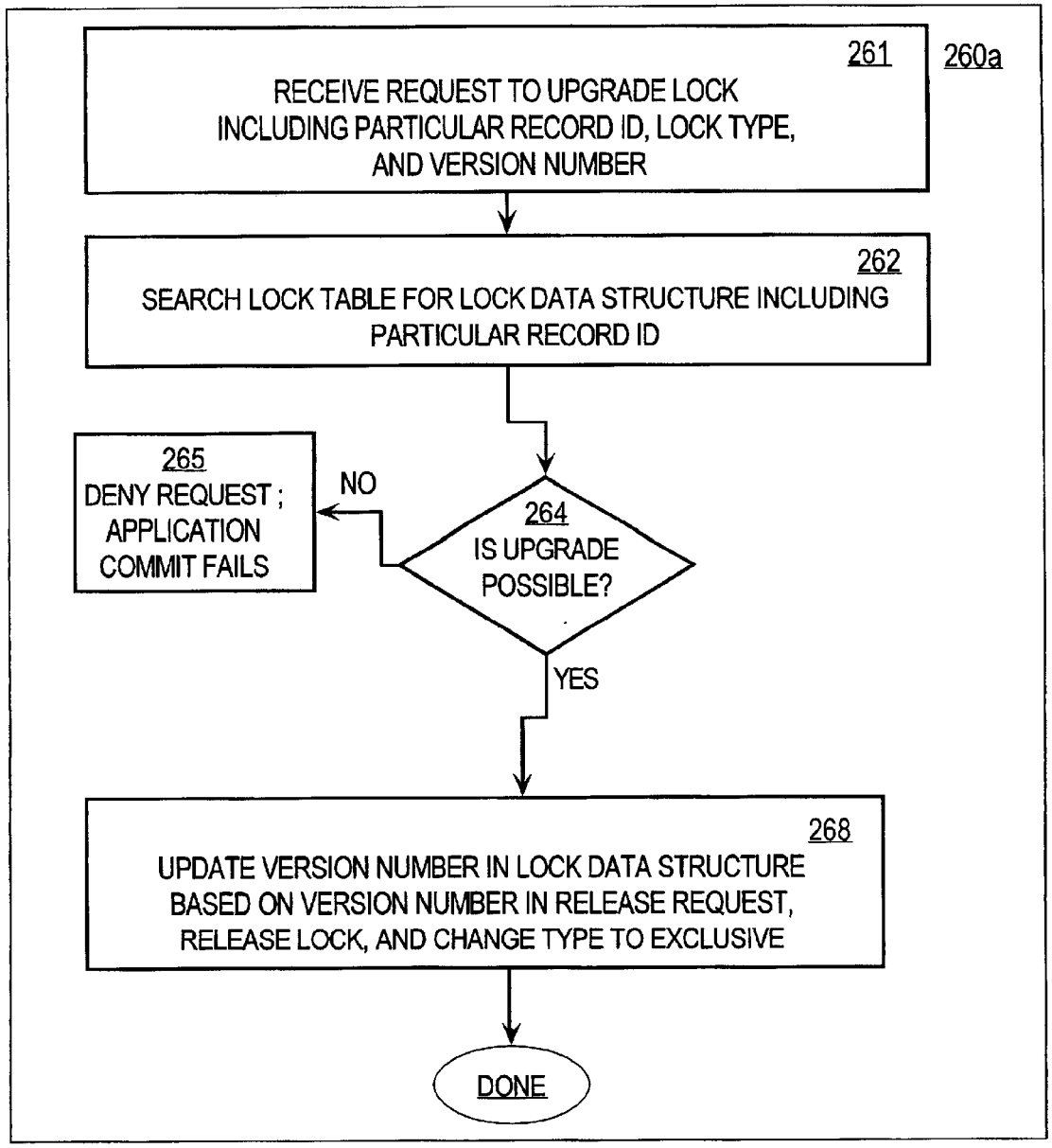
FIG. 2C is a flowchart that illustrates processing of a request to release a lock by a lock manager according to one embodiment of a method for providing concurrent access to a database.

FIG. 2C is a flowchart that illustrates processing of a request to release a lock by a lock manager according to one embodiment 260a of step 260 in FIG. 2A.

In step 261, the lock manager receives a request to upgrade a lock represented by a lock object 141 from shared to exclusive. The request to release includes the database object ID of the particular database object, such as a database record. The request also includes the lock type and the value of the version number contained in the lock object 141 being released. In one embodiment, the database server includes the lock object 141 in the request. This automatically provides the information needed by the lock manager to perform the remaining steps in embodiment 260a.

In step 262, the lock manager searches the lock table 142 to find the lock data structure 144 that includes a value for the database object identification equal to the value of the database object ID in the request to release a lock. If such a record is not found, an error has occurred that is handled by an error handling process. Any suitable error-handling process may be used. If the lock data structure 144 is found corresponding to the particular database object in the lock being released, control passes to step 264.

In step 264, it is determined whether upgrading the lock from optimistic to exclusive is possible, based on the lock type in the request for release and the granted lock type in the lock data structure 144 corresponding to the same database object. If no upgrade is possible, as indicated by step 265, then the request to upgrade is denied, which will cause the associated database application to fail to commit the current transaction. If an upgrade is possible, control passes to step 268. An upgrade is possible only when the granted lock type is optimistic.

Step 268 generally involves upgrading a lock to exclusive. Specifically, the lock manager updates the value of the version number in the lock data structure 144 based on the value of the version number in the upgrade request. The version number in the upgrade request is different if it was changed by the database server process 132 while the database server process 132 was in possession of the lock object 141 being upgraded in this request. While the database server process 132 was in possession of the exclusive lock, it was free to write new values into the database object. The lock is also released.

The lock manager is responsible to change the value of the version number whenever a lock upgrade occurs successfully or the database server process changes the contents of a database object. In this circumstance, the version number is changed by a predetermined version change value so that the version number changes are monotonic. In this embodiment, the predetermined version change value is positive "1," which amounts to incrementing the version number when a database server is in possession of an exclusive lock and has changed the contents of the database object corresponding to the exclusive lock.

If the database server does not change the contents of the database object before releasing the exclusive lock, then the database server does not change the value of the version number. Thus, when the exclusive lock is released, the version number will reflect whether the contents of the corresponding database object have been changed while the database server was in possession of the exclusive lock.

In step 268, the lock manager brings the version number stored in the lock data structure into agreement with the version number in the exclusive lock being released. If they already agree, the lock data structure is left unchanged. This change in version number is an important signal to the database server that the contents of a particular database object have been changed since the database server first obtained a lock for the particular database object. This circumstance is important during an update process with optimistic locking, as described further with respect to FIG. 3A and FIG. 3B.

In step 268, the lock manager also changes the lock type to exclusive, because there may be one or more optimistic locks granted to the database server for one or more other database application processes. Whether there are one or more other locks for the same database object will depend on the value in the reference number field 146 and the lock data structure 144. If there are no other locks granted, then the value in the reference number field 146 would equal the initial value for the reference number field.

The steps described above allow a lock manager 140 to use the lock data structure 144 and lock object 141 to perform optimistic locking during database updates according to embodiments of the present invention. The following section describes one embodiment of a method by which a database server uses the above described lock manager to perform database updates with optimistic locking.

Use of Lock Manager by Database Server for Updates

Figure 3A:
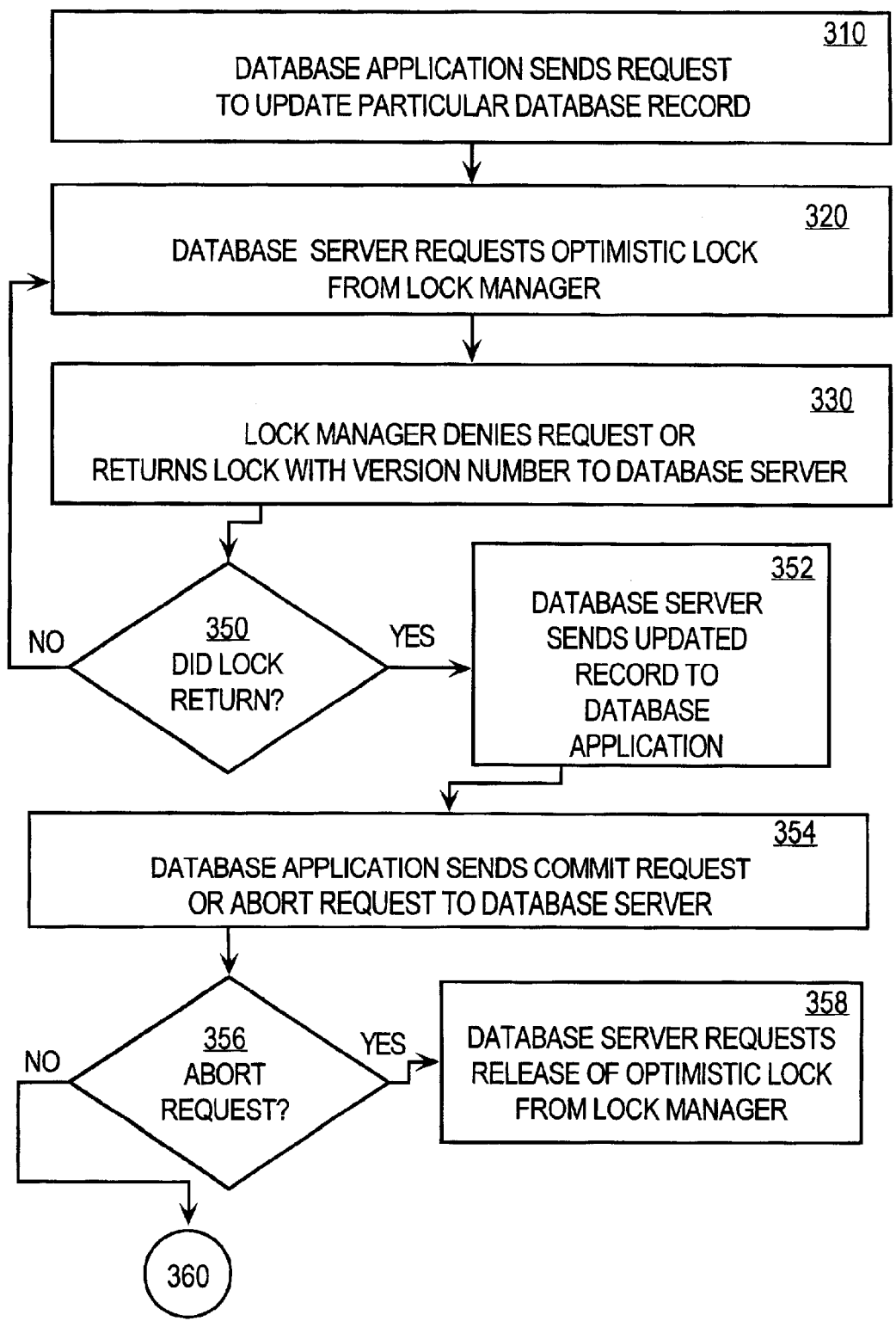
FIG. 3A is a flowchart that illustrates a first part of the processing by a database server according to one embodiment of a method for updating a database object using optimistic locks.
Figure 3B:
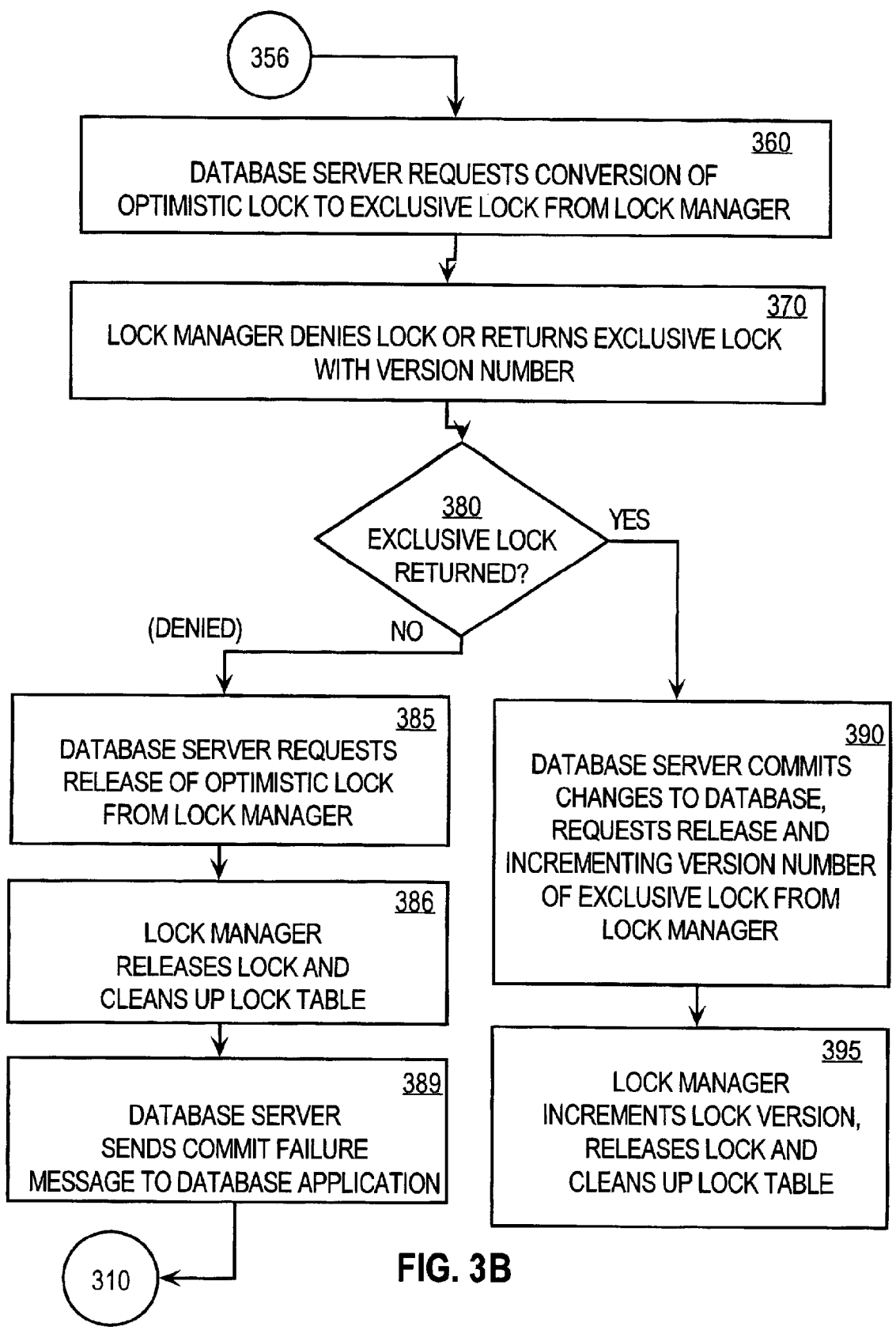
FIG. 3B is a flowchart that illustrates a second part of the processing by a database server according to one embodiment of a method for updating a database object using optimistic locks.

FIG. 3A and FIG. 3B show a flowchart that illustrates processing by a database server according to one embodiment of a method for updating a database object using optimistic locks.

In step 310, a database application sends a command to the database server to update a particular database record. For example, database application 138a requests the database server to update the account balance attribute of account 1234 by $20 because of a deposit made by Ms. X, the owner of account 1234. In step 320 the database server receives the request from the database application and requests an optimistic lock from the lock manager. In step 330, the lock manager responds to the request for an optimistic lock. Its response can comprise either denying the request or returning a lock object.

If the lock object is returned, it includes a value for the version number in the lock data structure 144 at the time the lock is granted and returned to the database server. For example, when the lock is granted it returns a version number of "2" indicating that the contents of account 1234 have changed once since the lock manager first granted a lock for account 1234.

In addition, if the lock object is returned, the value of the reference number of the lock data structure is incremented. For example, if the lock manager has granted two shared locks to clients processes 122a and 122b to read the account record for account 1234, and has granted one optimistic lock to database application 138b to update the account record for account 1234, before granting the current request, and none of the three prior locks have been released, then the reference number had a value of "3" before the current request. Upon granting the optimistic lock for the current request for database application 138a, the reference number is incremented to a value of "4" because four discrete processes requested the locks.

Values for key fields in the lock data structure 144 and lock 141 at different stages of the process described here are listed in Table 2. In Table 2, sequential stage 1 refers to a time before the current request for an optimistic lock object is granted, and sequential stage 2 refers to a time after the current request for an optimistic lock object is granted. In sequential stage 2, the reference number in the lock data structure (LDS) has been incremented, and that the version number in the lock object (LO) agrees with the version number in the lock data structure.

TABLE 2

EVOLUTION OF VALUES IN KEY FIELDS OF LOCK DATA STRUCTURE (LDS) AND LOCK OBJECT (LO)

| Sequential stage | Database Object ID | LDS Lock Type | LDS Version # | LDS Reference # | LO Lock Type | LO Version # |
|---|---|---|---|---|---|---|
| 1  | 1234 | O | 2 | 3 | — | — |
| 2  | 1234 | O | 2 | 4 | O | 2 |
| 3a | 1234 | O | 2 | 3 | — | — |
| 3b | 1234 | O | 3 | 3 | O | 2 |
| 4  | 1234 | E | 3 | 4 | E | 3 |
| 5  | 1234 | O | 3 | 2 | — | — |
| 6  | 1234 | O | 3 | 3 | O | 3 |
| 7  | 1234 | E | 3 | 4 | E | 3 |
| 8  | 1234 | E | 3 | 4 | E | 4 |
| 9  | 1234 | O | 4 | 3 | O | 3 |
| 10 | 1234 | O | 4 | 2 | — | — |

Step 350 represents a branch point in which control passes back to step 320 if the request for a lock was denied, and control passes to step 352 if the optimistic lock is granted. In this embodiment, when the request is denied the database server simply initiates another request for the optimistic lock. When the optimistic lock is granted, control passes to step 352.

In step 352, the database server sends an updated record to the database application. This may involve using the optimistic lock to read the contents of the database object, change the values associated with the update request in a local copy of the database object, and sends the local copy with the modified contents to the database application. For example, the database server uses the optimistic lock to read the contents of the balance for account 1234 and obtains a value of $300. The database server applies the $20 deposit to obtain a modified balance of $320. This modified balance does not yet appear in the database object 151 in the database 150 or cache 134, but only in the local copy of the database object maintained by the database server 132.

In step 354, the database application determines whether the local copy with the modified contents is acceptable to commit to the database, or whether a transaction abort should occur. In step 356, the database server determines whether the database application has determined to abort the transaction. If so, control passes to step 358 where the database server requests a lock manager to release the optimistic lock. Because only an optimistic lock is being released, the version number stored by the lock manager in the lock data structure 144 is not modified. However, the lock manager decrements the reference number by the amount the reference number was incremented when the lock was granted in step 330. Release of the optimistic lock in this alternative case is indicated in Table 2 by sequential stage 3a.

If the database server determines that the database application has determined to commit the modified contents to the database, then control passes to step 360 in FIG. 3B. In step 360, the database server requests an exclusive lock for the particular database object for which the database server already holds an optimistic lock.

In step 370, the lock manager responds to the request for an exclusive lock by either denying the request or returning the exclusive lock with a current value for the version number.

Step 380 represents a branch point based on whether the exclusive lock was returned or not. If an exclusive lock was not returned, that is, the request was denied, control passes to step 385 to release the associated optimistic lock and generate a transaction commit failure. One reason the request would be denied is if a different database application already holds an exclusive lock for that particular database object.

For purposes of this example, it is assumed that database application 138b has already been granted an exclusive lock on the database object identified by account number 1234. The request for an exclusive lock for database application 138a is therefore passed to step 385 to cause release and transaction failure. While the database server has possession of the exclusive lock for competing database application 138b, it commits a change to the database.

For example, the database application 138b maybe a dividend-computing application that computes a dividend of $10 to add to the balance in account 1234. The database server used the exclusive lock obtained for database application 138b to commit this $10 update to the database. The actual balance in account 1234 is now $310, not the $300 in the local copy of the database object being used by the database server for database application 138a. In this circumstance, as described in more detail below with respect to step 390, the database server releases the prior optimistic lock to the lock manager. The state of the lock data structure at this juncture is represented by alternative sequential stage 3b in Table 2. As compared with sequential stage 2, in stage 3b the version number in the lock data structure has been incremented, the reference number in the lock data structure has been decremented, and the lock type in the lock data structure has been returned to optimistic.

At this point, a request by the database server for the exclusive lock for database application 138a is granted by the lock manager. The states of the lock data structure and the granted lock object are represented in Table 2 by sequential stage 4. The lock data structure shows a lock type of exclusive and the reference number has been incremented to indicate the new lock granted. The database server for database application 138a still has the optimistic lock, as indicated at sequential stage 3b, and now has an additional lock of type exclusive for the same database object. The version number in the exclusive lock object is "3," in agreement with the version number in the lock data structure at the time the exclusive lock object was generated.

If an exclusive lock is returned in step 380, the update process proceeds and control passes to step 390.

In the example illustrated in Table 2, the version number has changed, and the update process cannot proceed. It is to be noted that the version number in the optimistic lock, represented by sequential stage 3b, has a value of "2," whereas the version number in the exclusive lock, represented by sequential stage 4, has a value of "3." This difference in values for the version number tells the database server that the database object for account 1234 has been modified since the update process was initiated in response to database application 138a. The database server and database application 138a cannot assume that the balance is $300 as it was when the update started.

In step 390, the database server commits changes to the database, for example, by replacing the database object in cache 134, having a balance of $310 with the modified content of the database object in the local copy, having a balance of $330. Other ways to commit a change to the database are applied in other embodiments. The database server then sends a request to the lock manager to release exclusive lock 3 and to increment its version number.

In step 395, the lock manager processes the release request. This includes incrementing the version number from the released exclusive lock object and storing it into the lock data structure. This processing also includes changing the lock type to optimistic and decrementing the reference number. At this point of time, the state of the lock data structure is presented in Table 2 at sequential stage 9. The exclusive lock is now gone leaving only the optimistic lock for account 1234. If the optimistic lock is also released, then the state of the lock data structure is as represented at sequential stage 10. In this stage the reference number has been decremented and the database server no longer holds a lock for database application 138a on account 1234.

Using the techniques described above, optimistic locking for updates can be handled using lock objects 141 and lock data structures 144 with version numbers rather than adding a version number to the database objects 151 and schema 152 of the database 150. Consequently, the extra space required for version numbers is eliminated from the database 150, the cache 134, and the transactions log 136.

Hardware Overview

Figure 4:
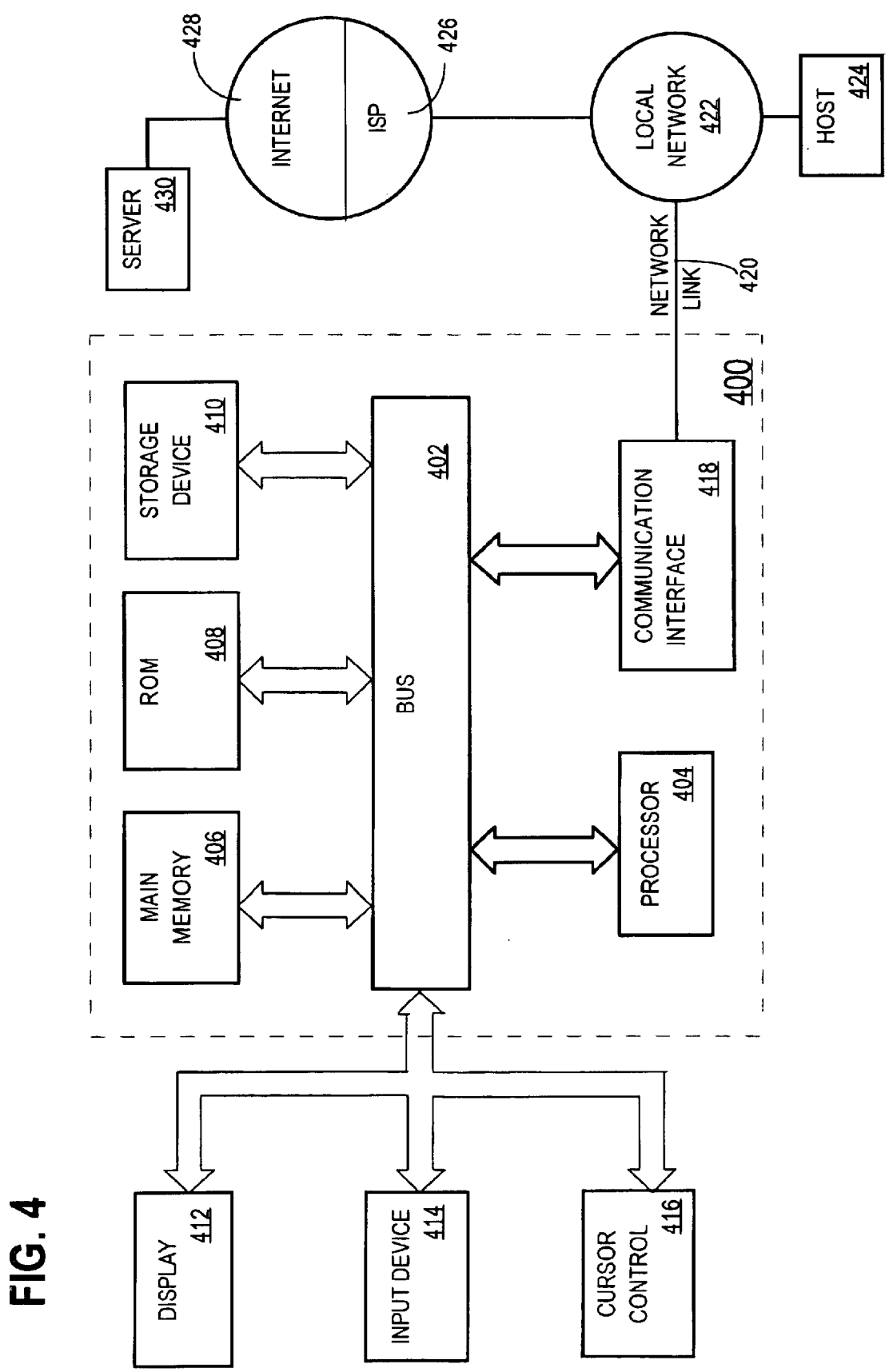
FIG. 4 is a block diagram that illustrates a computer system upon which an embodiment may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory ("RAM") or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory ("ROM") 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube ("CRT"), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for optimistic locking. According to one embodiment of the invention, optimistic locking is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry maybe used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network ("ISDN") card or a modem to provide a data communication connection to a corresponding type of telephone line. As another example, communication interface 418 may be a local area network ("LAN") card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider ("ISP") 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for lock management as described herein.

The received code may be executed by processor 404 as it is received, and/or stored in storage device 410, or other non-volatile storage for later execution. In this manner, computer system 400 may obtain application code in the form of a carrier wave.

Scope

In the foregoing specification, the invention has been described with reference to specific embodiments thereof. It will, however, be evident that various modifications and changes may be made thereto without departing from the broader spirit and scope of the invention. For example, the methods can be effected in alternative embodiments that change the order of some steps and skip others. The specification and drawings are, accordingly, to be regarded in an illustrative rather than a restrictive sense. The scope and spirit of the invention is therefore provided by the appended claims and their equivalents.

What is claimed is:

1. A method of updating a resource object using optimistic locks, the method comprising the computer-implemented steps of:

receiving from a client process a request to update a particular resource object;

sending to a lock manager process a request for a first lock for access to the particular resource object, the request including data indicating an optimistic lock type;

receiving the first lock for access to the particular resource object, the first lock including data indicating the resource object, the optimistic lock type and a first value for a version number related to a number of changes to the resource object since the lock manager generated a lock data structure corresponding to the resource object; and updating the resource object by sending to a lock manager process a request for a second lock for access to the particular resource object, the request including data indicating the resource object identification and an exclusive lock type;

receiving the second lock for access to the particular resource object, the second lock including data indicating the resource object identification, the exclusive lock type and a second value for the version number;

determining whether the second value for the version number substantially equals the first value for the version number; and if the second value substantially equals the first value, then committing an updated resource object to the resource, and replacing the second value for the version number in the second lock with a third value for the version number, the third value computed by adding the second value and a predetermined version change value.

2. A method as recited in claim 1, wherein:

the second lock further comprises a reference number set to a predetermined initial value, the method further comprising the steps of:

receiving the second lock to be released having data indicating the particular resource object;

determining whether the reference number of the second lock to be released substantially equals the predetermined initial value of the reference number; and if it is determined the reference number of the second lock to be released does not substantially equal the predetermined initial value, then replacing the value of the reference number in the second lock with a difference substantially equal to the value of the reference number in the second lock minus a predetermined reference change value.

3. A method as recited in claim 2, further comprising, if it is determined the reference number of the second lock to be released substantially equals the predetermined initial value, then deleting the second lock for the particular resource object.

4. The method as recited in claim 1, further comprising, if the second value does not substantially equal the first value, then sending a message to the client process, the message indicating that the resource object was not updated.

5. The method as recited in claim 4, further comprising sending to the lock manager process a release message to release the second lock, the release message including data indicating the third value of the version number in the second lock and the exclusive lock type, wherein the third value of the version nwnber is used by the lock manager to replace the second value of the version number in the lock data structure.

6. The method as recited in claim 1, further comprising sending to the lock manager process a first release message to release the first lock.

7. The method as recited in claim 6, further comprising sending to the lock manager process a second release message to release the second lock.

8. A computer-readable medium carrying one or more sequences of instructions for updating a resource object, which instructions, when executed by one or more processors, cause the one or more processors to carry out the steps of:

receiving from a client process a request to update a particular resource object;

sending to a lock manager process a request for a first lock for access to the particular resource object, the request including data indicating an optimistic lock type;

receiving the first lock for access to the particular resource object, the first lock including data indicating the resource object, the optimistic lock type and a first value for a version number related to a number of changes to the resource object since the lock manager generated a lock data structure corresponding to the resource object; and updating the resource object by sending to a lock manager process a request for a second lock for access to the particular resource object, the request including data indicating the resource object identification and an exclusive lock type;

receiving the second lock for access to the particular resource object, the second lock including data indicating the resource object identification, the exclusive lock type and a second value for the version number;

determining whether the second value for the version number substantially equals the first value for the version number, and if the second value substantially equals the first value, then committing an updated resource object to the resource, and replacing the second value for the version number in the second lock with a third value for the version number, the third value computed by adding the second value and a predetermined version change value.

9. The computer-readable medium as recited in claim 8, wherein the instructions, when executed by one or more processors, cause the one or more processors to carry out the step of:

if the second value does not substantially equal the first value, then sending a message to the client process, the message indicating that the resource object was not updated.

10. The computer-readable medium as recited in claim 9, wherein the instructions, when executed by one or more processors, cause the one or more processors to carry out the step of:

sending to the lock manager process a release message to release the second lock, the release message including data indicating the third value of the version number in the second lock and the exclusive lock type, wherein the third value of the version number is used by the lock manager to replace the second value of the version number in the lock data structure.

11. The computer-readable medium as recited in claim 8, wherein the instructions, when executed by one or more processors, cause the one or more processors to carry out the step of:

sending to the lock manager process a first release message to release the first lock.

12. The computer-readable medium as recited in claim 11, wherein the instructions, when executed by one or more processors, cause the one or more processors to carry out the step of:

sending to the lock manager process a second release message to release the second lock.

13. The computer-readable medium of claim 8, wherein the second lock further comprises a reference number set to a predetermined initial value, and wherein the instructions cause the one or more processors to perform the steps of:

receiving the second lock to be released having data indicating the particular resource object;

determining whether the reference number of the second lock to be released substantially equals the predetermined initial value of the reference number; and if it is determined the reference number of the second lock to be released does not substantially equal the predetermined initial value, then replacing the value of the reference number in the second lock with a difference substantially equal to the value of the reference number in the second lock minus a predetermined reference change value.

14. A computer-readable medium of claim 13, wherein the instructions cause the one or more processors to perform the step of, if it is determined the reference number of the second lock to be released substantially equals the predetermined initial value, then deleting the second lock for the particular resource object.

15. An apparatus for updating a resource object, comprising:

a processor;

one or more stored sequences of instructions which, when executed by the processor, cause the processor to carry out the steps of:

receiving from a client process a request to update a particular resource object;

sending to a lock manager process a request for a first lock for access to the particular resource object, the request including data indicating an optimistic lock type, receiving the first lock for access to the particular resource object, the first lock including data indicating the resource object, the optimistic lock type and a first value for a version number related to a number of changes to the resource object since the lock manager generated a lock data structure corresponding to the resource object; and updating the resource object by sending to a lock manager process a request for a second lock for access to the particular resource object, the request including data indicating the resource object identification and an exclusive lock type;

receiving the second lock for access to the particular resource object, the second lock including data indicating the resource object identification, the exclusive lock type and a second value for the version number, determining whether the second value for the version number substantially equals the first value for the version number, and if the second value substantially equals the first value, then committing an updated resource object to the resource, and replacing the second value for the version number in the second lock with a third value for the version number, the third value computed by adding the second value and a predetermined version change value.

16. The apparatus as recited in claim 15, wherein the instructions, when executed by one or more processors, cause the one or more processors to carry out the step of:

the second value does not substantially equal the first value, then sending a message to the client process, the message indicating that the resource object was not updated.

17. The apparatus as recited in claim 16, wherein the instructions, when executed by one or more processors, cause the one or more processors to carry out the step of:

sending to the lock manager process a release message to release the second lock, the release message including data indicating the third value of the version number in the second lock and the exclusive lock type, wherein the third value of the version number is used by the lock manager to replace the second value of the version number in the lock data structure.

18. The apparatus as recited in claim 15, wherein the instructions, when executed by one or more processors, cause the one or more processors to carry out the step of:

sending to the lock manager process a first release message to release the first lock.

19. The apparatus as recited in claim 18, wherein the instructions, when executed by one or more processors, cause the one or more processors to carry out the step of:

sending to the lock manager process a second release message to release the second lock.

20. The apparatus of claim 15, wherein the second lock further comprises a reference number set to a predetermined initial value, and wherein the instructions cause the one or more processors to perform the steps of:

receiving the second lock to be released having data indicating the particular resource object;

determining whether the reference number of the second lock to be released substantially equals the predetermined initial value of the reference number; and if it is determined the reference number of the second lock to be released does not substantially equal the predetermined initial value, then replacing the value of the reference number in the second lock with a difference substantially equal to the value of the reference number in the second lock minus a predetermined reference change value.

21. The apparatus of claim 20, wherein the instructions cause the one or more processors to perform the steps of:

if it is determined the reference number of the second lock to be released substantially equals the predetermined initial value, then deleting the second lock for the particular resource object.

22. An apparatus for updating a resource object, comprising:

a means for receiving from a client process a request to update a particular resource object;

a means for sending to a lock manager process a request for a first lock for access to the particular resource object, the request including data indicating an optimistic lock type;

a means for receiving the first lock for access to the particular resource object, the first lock including data indicating the resource object, the optimistic lock type and a first value for a version number related to a number of changes to the resource object since the lock manager generated a lock data structure corresponding to the resource object; and a means for updating the resource object, including a means for sending to a lock manager process a request for a second lock for access to the particular resource object, the request including data indicating the resource object identification and an exclusive lock type;

a means for receiving the second lock for access to the particular resource object, the second lock including data indicating the resource object identification, the exclusive lock type and a second value for the version number;

a means for determining whether the second value for the version number substantially equals the first value for the version number;

a means for committing an updated resource object to the resource if the second value substantially equals the first value; and a means for replacing the second value for the version number in the second lock with a third value for the version number if the second value substantially equals the first value, the third value computed by adding the second value and a predetermined version change value.

23. The apparatus as recited in claim 22, further comprising:

means for sending a message to the client process if the second value does not substantially equal the first value, the message indicating that the resource object was not updated.

24. The apparatus as recited in claim 23, further comprising:

means for sending to the lock manager process a second release message to release the second lock, the second release message including data indicating the third value of the version number in the second lock and the exclusive lock type, wherein the third value of the version number is used by the lock manager to replace the second value of the version number in the lock data structure.

25. The apparatus as recited in claim 22, further comprising:

means for sending to the lock manager process a fist release message to release the first lock.

26. The apparatus as recited in claim 25, further comprising:

means for sending to the lock manager process a second release message to release the second lock.

27. The apparatus of claim 22, wherein the second lock further comprises a reference number set to a predetermined initial value, the apparatus further comprising:

means for receiving the second lock to be released having data indicating the particular resource object;

means for determining whether the reference number of the second lock to be released substantially equals the predetermined initial value of the reference number; and means for replacing the value of the reference number in the second lock with a difference substantially equal to the value of the reference number in the second lock minus a predetermined reference change value, if it is determined the reference number of the second lock to be released does not substantially equal the predetermined initial value.

28. The apparatus of claim 27, further comprising:

means for deleting the second lock for the particular resource object if it is determined the reference number of the second lock to be released substantially equals the predetermined initial value.

* * * * *

UNITED STATES PATENT AND TRADEMARK OFFICE
CERTIFICATE OF CORRECTION

PATENT NO. : 6,850,938 B1
DATED : February 1, 2005
INVENTOR(S) : Shahrokh Sadjadi It is certified that error appears in the above-identified patent and that said Letters Patent is hereby corrected as shown below:

Title page,
Item [56], References Cited, OTHER PUBLICATIONS, please insert
-- Graham Thornton, "Optimistic Locking with Concurrency in Oracle," Document Revision Date: 2/2/01, pp. 1-9.
Microsoft Corporation, ".NET Framework Developer's Guide, Optimistic Concurrency," 2003, http://msdn.microsoft.com/library/default.asp?url=/library/en-us/cpguide/html/cpconoptimisticconcurrency.asp, printed 9/18/2003, pp. 1-4. --

Column 17,
Line 49, delete "nwnber" and insert -- number --.

Column 19,
Line 61, before "the second value does not substantially equal the first", insert -- if --.

Column 22,
Line 3, delete "fist" and insert -- first --.

Signed and Sealed this

Third Day of May, 2005

JON W. DUDAS
*Director of the United States Patent and Trademark Office*